Dec. 10, 1963  E. K. WEISE  3,114,082
ELECTRIC CONTROL CIRCUITS USING THERMISTORS
Filed Jan. 12, 1961

Inventor
Erwin K. Weise
Hilmond O. Vogel
Attorney

# United States Patent Office 3,114,082
Patented Dec. 10, 1963

3,114,082
ELECTRIC CONTROL CIRCUITS USING THERMISTORS
Erwin K. Weise, Urbana, Ill., assignor, by mesne assignments, to K. H. Huppert Co., a corporation of Illinois
Filed Jan. 12, 1961, Ser. No. 82,345
14 Claims. (Cl. 317—132)

This invention relates generally to electric control circuits, and more particularly to improved temperature control circuits for electric furnaces.

Since the development of thermistors, both with a positive and negative temperature coefficient of electrical resistance, hereinafter called positive and negative thermistors, many uses for them have been found in electric control circuits. This is due to two inherent features of these devices. One is the size of the temperature coefficient of resistance, which can be many times larger than that exhibited by metals. The other is the special shape of the voltage-current characteristic, a part of which, in the case of negative thermistors, can show decreasing voltage values with increasing current values. In certain circuits this can lead to large changes of the current with relatively small changes of the voltage.

It is the object of the present invention to provide certain series circuits using thermistors for controlling the operation of electric circuits, in particular controlling the temperature of electric furnaces.

It is a further object of the present invention to provide an electric pointer instrument, indicating temperature, with a thermistor arrangement such that at a certain predetermined temperature value the thermistor arrangement will effectively control the operation of an electric furnace.

It is a further object of the present invention to provide a certain electrical control circuit including a temperature meter and a thermistor arrangement which will accurately control the temperature of an electric furnace.

It is a further object of the present invention to provide an electrically heated furnace with a temperature meter and a certain thermistor arrangement associated with the temperature meter and the electric furnace in a certain circuit arrangement so that the temperature of the electric furnace may be maintained within a particular predetermined temperature range.

Other objects and features of the present invention will be apparent from the following specification and drawings of which:

Figure 1:
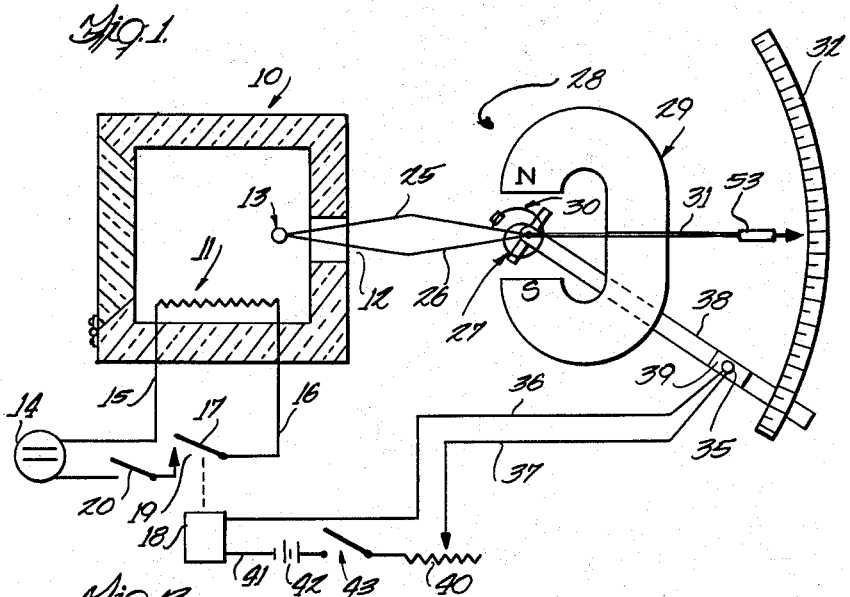
FIGURE 1 is a diagrammatic view of a control arrangement constructed according to the present invention.
Figure 2:
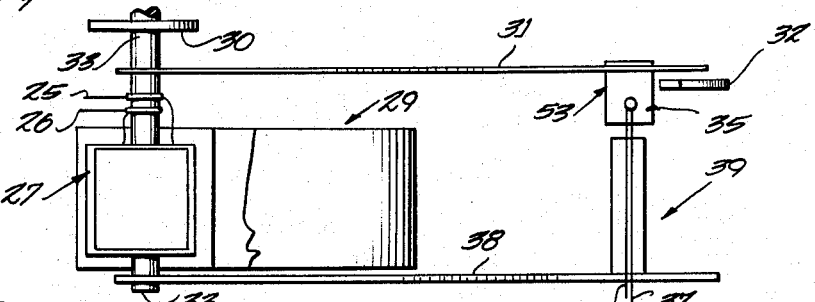
FIGURE 2 is an enlarged side elevational view of the temperature meter of FIGURE 1 and shown somewhat diagrammatically.

It is to be understood that the present embodiment is the preferred embodiment. Many modifications and changes may be made by one skilled in the art without departing from the spirit and scope of the present invention.

Generally the present invention comprises the arrangement of a temperature meter with a pointer which moves along a graduated scale indicating various temperatures, a thermocouple energizing the temperature meter, and a thermistor movably mounted in a temperature meter case and positionable in alignment with any selected temperature mark on the graduated scale. The thermistor is further connected in an electric circuit for controlling the temperature of an electric furnace. The invention further includes some means carried by the pointer of the temperature meter for cooling the thermistor at certain predetermined pointer positions on the graduated scale. As the thermistor is relatively rapidly cooled after the pointer reaches the predetermined pointer position, the resistance of the thermistor is rapidly and greatly changed, and this change in resistance is used to control the operation of the electric furnace by means of a control relay.

For a detailed description of one embodiment of the present invention, reference is made to the drawing. An electric furnace 10 is provided having a resistance heating coil 11 which is connected to one pole of a power source 14 by a conductor 15. The other side of the heating element 11 is connected to the armature 17 of relay 18 by means of conductor 16. Armature 17 carries one contact of the pair of normally opened contacts 19. The other contact of the pair of contacts 19 is connected to one side of switch 20, and the other side of switch 20 is connected to the other pole of power source 14. When relay 18 is energized and the switch 20 is closed, a circuit is completed for the energization of the heating element 11 by the power source 14.

A thermocouple 13 is inserted through a small opening 12 in the furnace 10 and is connected by means of the conductors 25 and 26 to the coil 27 of the temperature meter 28. The pointer 31 of the meter 28 rotates with coil 27 against the tension of spring 30 about the axis of pin means 33. When a current from thermocouple 13 flows through coil 27, coil 27 rotates in the field of magnet 29 and the pointer 31 is moved to a certain position on scale 32 to indicate a degree of temperature which is the temperature of the furnace 10 upon proper calibration.

A small thermistor 35 is supported by an insulated holder 39. The insulated holder 39 is carried on an arm 38 which is carried in the case of the temperature meter 28 for rotation about the axis of pin means 33 so that the thermistor 35 can be manually positioned substantially in alignment with any selected temperature mark upon scale 32. The thermistor is connected to conductors 36 and 37. The other end of conductor 36 is connected to one side of the coil of relay 18. The other end of conductor 37 is connected to the movable arm of rheostat 40. Rheostat 40 is connected to one side of the switch 43. The other side of the switch 43 is connected to one pole of the power source 42. The other pole of the power source 42 is connected by conductor 41 to the other side of the coil of relay 18. Upon the closing of switch 43 the following circuit is completed: from one pole of power source 42, conductor 41, coil of relay 18, conductor 36, thermistor 35, conductor 37, rheostat 40, switch 43, to the other pole of power source 42.

The pointer 31 carries a thin vane or flag 53 of a material either of aluminum or gold, or of another material with a high heat conductivity. The vane 53 is carried at such a position on pointer 31 that it will touch thermistor 35 upon a certain degree of rotation of pointer 31 about the axis of pin means 33, effecting in this manner a sudden cooling of the thermistor 35. This cooling of thermistor 35 is an important feature of the present invention. The location of the meeting of the thermistor 35 and the vane 53 can be predetermined by moving the arm 38 to move thermistor 35 into such a position that it is touched by member 53 when pointer 31 indicates the temperature to be controlled. The manner in which the control action occurs will be explained with reference to FIGURE 3.

Figure 3:
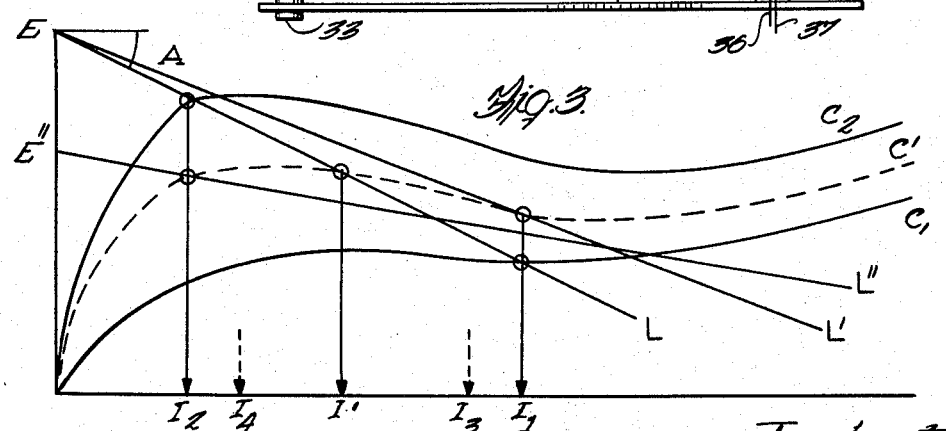
FIGURE 3 is a graph aiding in an explanation of the present invention.

FIGURE 3 shows two voltage-current characteristics of the thermistor 35, indicated by the curves designated C1 and C2, and one of the rheostat 40, indicated by the straight line designated L. The curve C1 is the ordinary voltage-current characteristic of thermistor 35 at cooling conditions prevailing if the thermistor 35 is supported freely in air having a certain constant environmental temperature. Curve C2 is the voltage-current characteristic of thermistor 35 at cooling conditions occurring when thermistor 35 is touched by vane 53. In both cases thermistor 35 has a higher temperature than the certain environmental temperature, which also is the temperature of vane 53, but in the first case, that of curve C1, the thermistor loses heat mainly by convection cooling through the air. In the second case, that of curve C2, there is the additional cooling effect due to the contact of the thermistor with vane 53. This increased cooling causes the thermistor to have a higher resistance which shifts the voltage-current curve to higher voltage values. Hence curve C2 is located above curve C1 as may be seen in FIGURE 3.

The straight line L is the ohmic voltage-current characteristic of rheostat 40 plotted with negative voltages from the voltage value E of the voltage source 42, as is usual in load line considerations. The angle A is determined by the equation: $\tan A$ equals $R$, where R is the resistance of rheostat 40. The other curves and lines of FIGURE 3 will be explained below.

The cooperation of the various elements of the present embodiment of the invention may be described as follows: When switch 20 is closed, no power is applied to heating element 11 because contacts 19 of relay 18 are open. To close contacts 19 and complete the circuit for element 11, it is necessary that switch 43 be closed. Current will then flow from power source 42 through rheostat 40, thermistor 35 and the coil of relay 18. The current flow will heat thermistor 35, and its resistance will decrease until an equilibrium state is reached at the value I1 in FIGURE 3. With the current value I3 being the one at which relay 18 will operate to close contacts 19, it may be seen the value I1 is greater than I3. With the operation of relay 18, the heating circuit for the furnace 10 is completed and the furnace 10 and thermocouple 13 will heat up. As the temperature of the furnace 10 increases, the current through the instrument coil 27 will increase and pointer 31 will move upwardly on the temperature scale 32. At the pre-selected temperature mark on scale 32 at which the thermistor 35 has been set, the vane 53 will touch thermistor 35 cooling it relatively suddenly. The resistance of thermistor 35 will increase and the operating point will move along load line L to the intercept with curve C2. Simultaneously therewith the current will decrease from I1 to I2. With current value I4 being that at which the relay 18 will restore to open contacts 19, it may be seen that the current value I2 is substantially lower than I4. Thus relay 18 will restore breaking the heating circuit for furnace 10 and as the furnace 10 cools, the temperature therein will drop. With the drop in temperature of the furnace, the pointer 31 will be moved downward on the scale 32, and the cooling vane 53 is removed from contact with thermistor 35. Thermistor 35 will then again heat up with the current in the circuit increasing from I2 to I1 passing the value I3. At the current value I3, the relay contacts 19 are closed and the furnace heating circuit is again completed to start a new cycle. In the above described operating arrangement, a negative thermistor 35 and a relay 18 with normally open contacts are provided. It should be noted that a positive thermistor can be used to substantially the same effect if the relay is provided with normally closed contacts. In this case the voltage-current characteristic of the thermistor will be positioned on the graph to be disposed roughly parallel to the voltage axis rather than the current axis as shown in FIGURE 3.

It has been found that occasionally some difficulty in operation may result under certain environmental conditions when, for example, either the temperature or humidity are too high or too low. Under conditions of excessively high humidity, a thin layer of water may condense on the surfaces of vane 53 or thermistor 35 and cause an adhesion of these two members which prevents their prompt separation when the furnace cools to bring the pointer 31 downwardly on the scale 32. This condition may be worsened when thermistor 35 carries a protective hygroscopic coating. This condition may be prevented by appropriate selection of the various components of the subject invention such that a relatively high thermistor temperature is used such that any moisture thereon would relatively rapidly evaporate. Further, a hygroscopic drying cartridge may be placed in the instrument case to lower the level of humidity to a satisfactory level. Further, in the case of extremely low humidity, the formation of electrostatic charges is possible. Should the charge on the thermistor 35 be different from the charge on the vane 53, an electrostatic attractive force will appear as soon as these two members come in electrically insulated but mechanical contact with each other. This condition can occur if a dust particle should drift between these members. The electrostatic attractive force will prevent a relatively prompt separation of vane 53 and thermistor 35 upon the cooling of the furnace. This condition can be avoided by enclosing a small amount of a radio-active material in the meter case. Such materials being known in the art of sensitive analytical balances as static eliminators. The possibility of electrostatic attraction may also be avoided by providing a galvanic electric connection between members 35 and 53 such as for example by connecting conductor 36 with the pin 33.

Considering next a condition wherein the environmental temperature of the thermistor 35 is too low, the curve C1 and C2 would be shifted upward toward higher voltage values and curve C1 may then be replaced by the dotted line curve C'. The current in the thermistor circuit will then rise only to the current value I' which it may be seen is lower than the necessary value I3 for operating relay 18. In this case the furnace would not be heated because contacts 19 in the heater circuit would be open. To prevent this situation, the power source 42 may be made adjustable in addition to the adjustability of the resistance of the rheostat 40. If the resistance of the rheostat 40 is decreased, the load line L will be changed to that designated L' and it may be seen that the intercept of that curve with curve C' is moved to higher current values, and possibly even to the former value of I1 shown in FIGURE 3. With that change, the circuit will operate as previously described. Of course in this case of too low an environmental temperature, the curve C2 would also be moved to higher voltage values, however this would cause no difficulties and need not be shown in FIGURE 3.

Considering next the situation wherein the environmental temperature of the thermistor 35 is too high, in that situation no difficulty occurs in operating the relay 18 to cause heating of the furnace. However, the cooling of the thermistor 35 by vane 53 would be relatively ineffective. Instead of curve C2 which is intercepted by the load line L at current value I2, there would be an intercept of L with a new curve which again may be for example the dotted line curve C' at the current I'. Since current I' is substantially greater than current I4, the current value for which the relay 18 will restore, relay 18 will remain operated. Thus the heating circuit for the furnace 10 will not be interrupted and the furnace 10 may heat up to ever higher temperatures, raising the possibility of damage thereto. In order to prevent this from happening, the voltage of the power source 42 may be lowered from the value E to the value E", and the resistance of rheostat 40 is lowered to a value indicated by the new load line L". The load line L" may be seen to intersect the curve C' at a lower current value than I', and possibly even at the above described current value I2 initially described above. Since this value will be less than the current value I4, relay 18 will restore when the current drops to the value I4 and the previously described operation is again established. From the foregoing it may be seen that the manner of compensating the thermistor circuit for extreme conditions of environmental temperature or humidity is to adjust the rheostat 40 and power source 42 to such values that the intercepts of the load line with the two voltage-current characteristics of the thermistor have such values that the current range for operation and restoration of the relay is covered by the current range between those intercepts.

Having described the invention, what is considered new and desired to be protected by Letters Patent is:

1. In an electrical control circuit, a thermistor having a high temperature coefficient of resistance, control circuit means connected to said thermistor and operating responsive to a change in the resistance thereof over the portions of the voltage-current characteristics of said thermistor for different temperatures thereof wherein the value of one of said voltage and current substantially greatly changes for relatively small changes in the other, and a member for mechanically contacting said thermistor to transfer heat with said thermistor to change the resistance thereof over said portions of said voltage-current characteristics.

2. In an electrical control circuit as claimed in claim 1 wherein said thermistor has a high positive temperature coefficient of resistance and wherein said member operates to cool said thermistor.

3. In an electrical control circuit as claimed in claim 1 wherein said thermistor has a high negative coefficient of resistance and wherein said member operates to cool said thermistor.

4. In an electrical control circuit as defined in claim 1, wherein said thermistor has a high negative temperature coefficient of resistance and wherein said member comprises a metal surface having a high thermal conductivity and operating to cool said thermistor upon mechanical contact therewith.

5. In an electrical temperature control circuit having pointer means mechanically moved in response to the controlled temperatures, a thermistor having a high temperature coefficient of resistance movably mounted in cooperation with said pointer means for selective positioning thereof at different positions corresponding to different controlled temperatures, control circuit means connected to said thermistor and operating responsive to a change in the resistance thereof over the portions of the voltage-current characteristics of said thermistor for different temperatures wherein the value of one said voltage and current substantially greatly changes for relatively small changes in the value of the other, and vane means mountable on said pointer means for transferring heat with said thermistor to change the resistance thereof over said portions of said voltage-current characteristics when said vane means mechanically contacts said thermistor at any position thereof.

6. In an electrical control circuit as claimed in claim 5 wherein said thermistor has a high positive temperature coefficient of resistance, and wherein said vane means cools said thermistor.

7. In an electrical control circuit as claimed in claim 6 wherein said thermistor has a high negative coefficient of resistance and wherein said vane means cools said thermistor.

8. In an electrical control circuit for controlling the temperature of a device, a thermistor having a high negative temperature coefficient of resistance, control circuit means for controlling the temperature of said device responsive to operations of said control circuit means, said control circuit means including a power source and connected to said thermistor, said power source heating said thermistor to a certain temperature by the current passing therethrough, said certain temperature being one wherein said thermistor has a relatively low resistance on one portion of the voltage-current characteristic of said thermistor for said certain temperature wherein the current substantially greatly changes for small changes in voltage, said control circuit means being formed to operate responsive to an increase in the resistance of said thermistor from the resistance thereof at said certain temperature to another resistance on one portion of the voltage-current characteristic of said thermistor for said another temperature wherein the current substantially greatly changes for relatively small changes in voltage, and means responsive to the temperature of said device for mechanically contacting said thermistor to cool said thermistor to said another temperature to increase the resistance thereof to said another resistance.

9. In an electrical control circuit as claimed in claim 8 wherein said last mentioned means comprises a vane formed of a material having a thermal conductivity sufficient to cool said thermistor upon mechanical contact therewith to increase the resistance thereof to said another resistance.

10. In an electrical control circuit arrangement for controlling the operation of an electrical relay controlled device, an adjustably positioned thermistor having a high temperature coefficient of resistance, a series circuit connectable to the coil of the relay of said electrical relay controlled device and including a power source and said thermistor, said series circuit being formed so that said thermistor is heated by the current of said power source to a certain temperature above the ambient air temperature and wherein the resistance of said thermistor thereat is within the portion of the voltage-current characteristic of said thermistor for said certain temperature wherein the value of one of said voltage and current substantially greatly changes for relatively small changes in the other, and means for mechanically contacting said thermistor in any adjusted position thereof to lower the temperature of said thermistor to change the resistance thereof to another value on the portion of the voltage-current characteristic of said thermistor for the lowered temperature wherein the value of one of said voltage and current substantially greatly changes for relatively small changes in the other, the parameters of said series circuit being selected to provide for operation and restoration of said relay within the range of resistance values of said thermistor.

11. In an electrical control circuit arrangement as claimed in claim 10 wherein said means for mechanically contacting said thermistor comprises a vane and means for moving said vane into mechanical contact with said thermistor in any adjusted position thereof, said vane being formed of a metal having a thermal conductivity sufficient to cool said thermistor to said another value when said vane is at the ambient air temperature.

12. In an electrical control circuit as claimed in claim 10 wherein said thermistor has a high positive temperature coefficient of resistance.

13. In an electrical control circuit as defined in claim 11, wherein said thermistor has a high negative temperature coefficient of resistance, a resistor in said series circuit, and wherein the parameters of said series circuit are formed to provide for operation of said relay when said thermistor is slightly below the highest temperature thereof and for restoration of said relay when said thermistor is slightly above the lowest temperature thereof.

14. In an electrical control circuit, a thermistor having a high negative temperature coefficient of resistance, a resistor and power source connected in a series circuit with said thermistor, the parameters of said series circuit being formed so that said thermistor is directly heated by the current of said power source to a certain temperature wherein the resistance of said thermistor thereat is within the portion of the voltage-current characteristic of said thermistor for said certain temperature wherein the current substantially greatly changes for relatively small changes in the voltage, a member for mechanically contacting said thermistor to cool said thermistor to a second certain temperature by the conduction of heat from said thermistor to said member, said second certain temperature being one wherein the resistance of said thermistor thereat is within the portion of the voltage-current characteristic of said thermistor for said second certain temperature wherein the current substantially greatly changes for relatively small changes in the voltage.

References Cited in the file of this patent

UNITED STATES PATENTS

| | | |
|---|---|---|
| 1,703,803 | Widstrom | Feb. 26, 1929 |
| 1,944,721 | Sell | Jan. 23, 1934 |
| 2,273,600 | Specht | Feb. 17, 1942 |
| 2,482,820 | Wolfson | Sept. 27, 1949 |
| 2,536,806 | Hansen | Jan. 2, 1951 |
| 2,928,037 | Lawrence | Mar. 8, 1960 |
| 2,947,875 | Beck | Aug. 2, 1960 |

FOREIGN PATENTS

| | | |
|---|---|---|
| 730,547 | Germany | Jan. 14, 1943 |